United States Patent
Lumme et al.

(10) Patent No.: US 6,711,689 B2
(45) Date of Patent: Mar. 23, 2004

(54) INTERCEPTION SYSTEM AND METHOD

(75) Inventors: Martti Lumme, Espoo (FI); Jaana Eloranta, Espoo (FI); Hannu Jokinen, Espoo (FI)

(73) Assignee: Nokia Corporation, Espoo (FI)

( * ) Notice: Subject to any disclaimer, the term of this patent is extended or adjusted under 35 U.S.C. 154(b) by 372 days.

(21) Appl. No.: 09/949,949

(22) Filed: Sep. 10, 2001

(65) Prior Publication Data

US 2002/0049913 A1 Apr. 25, 2002

Related U.S. Application Data

(63) Continuation of application No. PCT/EP99/01761, filed on Mar. 12, 1999.

(51) Int. Cl.$^7$ .................................................. G06F 1/24
(52) U.S. Cl. ........................ 713/201; 713/189; 713/200
(58) Field of Search ................................ 713/189, 200, 713/201

(56) References Cited

FOREIGN PATENT DOCUMENTS

| WO | WO 97/42784 | 11/1997 |
|---|---|---|
| WO | WO 99/17499 | 4/1999 |

OTHER PUBLICATIONS

So–Lin Yen and Hong–Kuang Hwang; "Intelligent MTS Monitoring System", Proceedings of the Annual International Carnahan Conference on Security Technology, Albuquerque, New Mexico, Oct. 12–14, 1994, Conf No. 28, pp. 185–187.

International Search Report for PCT/EP99/01761.

*Primary Examiner*—Thomas R. Peeso
(74) *Attorney, Agent, or Firm*—Squire, Sanders & Dempsey L.L.P.

(57) ABSTRACT

An interception system and method for performing a lawful interception in a packet network such as the GPRS or UMTS network is described. The interception system comprises an interception activation monitoring function, an interception activation and deactivation function, an interception data collection function and an interception data destination function. The interception data collection function can be implemented in an existing network node such as a GPRS support node, wherein an interception information is set in the corresponding PDP context, and the collection of the intercepted data is performed in response to the set interception information. Furthermore, the interception data destination function may be arranged in an interception browsing element arranged for browsing the intercepted databased on an external command received from another network element comprising the interception activation and deactivation function. Thereby, browsing and managing of the lawful interception can be separated into different network elements. In summary, a flexible interception system can be provided, which can be easily adapted to individual architectures of packet networks.

42 Claims, 5 Drawing Sheets

INTERCEPTION SYSTEM AND METHOD

This application is a continuation of international application Ser. No. PCT/EP99/01761, filed Mar. 12, 1999.

FIELD OF THE INVENTION

The present invention relates to an interception system and method for performing a lawful interception in a packet network such as the GPRS (General Packet Radio Services) or the UMTS (Universal Mobile Telecommunications System) network.

BACKGROUND OF THE INVENTION

The provision of a lawful interception is a requirement of national law, which is usually mandatory. From time to time, a network operator and/or a service provider will be required, according to a lawful authorization, to make available results of interception relating to specific identities to a specific interception authority or Law Enforcement Agency (LEA).

There are various aspects of interception. The respective national law describes under what conditions and with what restrictions interception is allowed. If an LEA wishes to use lawful interception as a tool, it will ask a prosecuting judge or other responsible body for a lawful authorization, such as a warrant. If the lawful authorization is granted, the LEA will present the lawful authorization to an access provider which provides access from a user's terminal to that network, to the network operator, or to the service provider via an administrative interface or procedure.

Such a lawful interception functionality is also needed in the packet switched part of new mobile data networks such as the GPRS and the UMTS.

Several approaches have been proposed so far. According to the hub approach, a hub is added to the GPRS backbone, such that all sessions will pass through the hub. The benefit of this system is that the SGSN (Serving GPRS Support Node) and the GGSN (Gateway GPRS Support Node) do not have to know anything about the lawful interception functionality. The hub consists of a pseudo GGSN interface and a pseudo SGSN interface, between which a Lawful Interception Node (LIN) is arranged.

According to another so-called SGSN/GGSN approach, a whole interception function is integrated into a combined SGSN/GGSN element. Every physical SGSN/GGSN element is linked by an own interface to an administrative function. The access method for delivering a GPRS interception information is based on a duplication of packets transmitted from an intercepted subscriber via the SGSN/GGSN element to another party. The duplicated packets are sent to a delivery function for delivering the corresponding interception information to the LEA.

However, national laws may require certain types of interception policies, wherein the interception functions allowed for the network operator may change.

Furthermore, various interception functions are required, such as store and forward intercepted data, real time data browsing, browsing at mobile stations, different interception data processings, multiplication of interception data for different destinations etc.

Therefore, a flexible interception system and method is required, which can be easily adapted to changing interception requirements.

SUMMARY OF THE INVENTION

It is therefore an object of the present invention to provide a flexible interception method and system.

This object is achieved by an interception system for performing a lawful interception in a packet network, comprising:
  interception activation and deactivation means for activating and deactivating current interception targets based on a received interception-related command;
  interception activation monitoring means for monitoring an activation of PDP contexts and for informing the interception activation and deactivation means of changes in PDP contexts;
  interception data collection means for collecting intercepted data in response to an interception target activation by said interception activation and deactivation means; and
  interception data destination means for receiving the collected intercepted data and forwarding it to a final interception destination.

Furthermore, the above object is achieved by a method for performing a lawful interception in a packet network, comprising the steps of:
  monitoring an activation of PDP contexts in order to detect changes in the PDP contexts;
  activating and deactivating current interception targets based on an interception-related command and the changes in the PDP contexts;
  collecting intercepted data in response to an interception target activation; and
  supplying the collected intercepted data to an interception destination.

Accordingly, due to the monitoring of the PDP contexts, a supervisor of the lawful interception may obtain information about all activated and deleted user connections. Thereby, intercepted connections can be selected and an interception for a specific tunnel can be requested rather than an interception for a given criterium. In this way, the interception data collection can be more easily implemented in a distributed manner, for example in a GGSN network element, to thereby provide a higher flexibility.

The main difference with regard to earlier proposed solutions is that the intercepted data can be filtered in a network element which anyway has to study the packet data. Thereby, different implementation of alternatives are allowed, depending on the over all network implementation architecture.

Moreover, a protocol can be established which makes the system robust, since the GGSN-SGSN traffic is operable even if specific lawful interception nodes like a lawful interception gateway are overloaded or even non-operable.

Furthermore, the interception data can be filtered more economically, since the filtering is performed at a place where it is anyway studied. Moreover, interception criteria can be stored only in the network element which implements the interception activation and deactivation functionality. Thus, configuration changes have to be made only in network element implementing the interception activation and deactivation functionality, such that a distribution of configuration data is not required.

Since the interception activation and deactivation means receives an information about the activation and deactivation of each tunnel, it can collect statistics of tunnels that satisfy a predetermined criterium. Furthermore, statistics of tunnels satisfying predetermined criteria can be collected so as to be used as a threshold value for activating an actual interception.

Due to the distributed interception functions, different security requirements can be applied to different functional units, even if they are implemented in the same network element.

If one or more functional units crash, the network may continue with a limited interception or without interception. In other words, the interception system can be implemented in a robust way. In case the functional units of the interception system are distributed over several existing network elements, the system is automatically scaleable. The reason therefore is that more network elements are anyway required in the network, if the network traffic increases. Furthermore, redundancy can be achieved automatically, if the implementation is distributed to existing network elements. If an existing network element is duplicated, the functional units implemented therein are also duplicated.

Due to the distributed functions of the proposed interception system, the lawful interception function is not dependent on the implementation architecture of the packet network and does not cause any bottleneck in the packet network. Furthermore, an implementation of the known Legal Interception Node (LIN) is not necessarily required, since the interception functions can be distributed to other existing network elements.

The final destination to which the collected intercepted data are forwarded may be a representative of a legal authority or a network operator.

Furthermore, the interception data destination means may be arranged to postprocess said intercepted data. The postprocessing may comprise decryption, formating and/or translation of the intercepted data.

The interception activation and deactivation means preferably receives the interception-related command from a user interface for lawful interception, wherein the interception-related command is a command for changing current interception criteria. In this case, the interception activation and deactivation means and the interception data destination means may be arranged in a network element comprising the user interface for lawful interception. Furthermore, the interception activation monitoring means and the interception data collection means may be arranged in a GPRS support node.

Preferably, the interception activation monitoring means is arranged to monitor tunnel activations and deactivations by monitoring corresponding GTP protocol messages, and to inform the interception activation and deactivation means about new possible interception targets and/or currently intercepted and now finished tunnels.

The interception activation monitoring means may be arranged in a lawful interception node, and adapted to recognize tunnel activation and deactivation requests on the basis of GTP protocol messages.

Furthermore, the interception activation monitoring means may be arranged in a gateway GPRS support node, a serving GPRS support node or a border gateway.

The interception activation and deactivation means may comprise an interception database and may be arranged to modify the interception database in response to the interception-related command.

Preferably, the interception activation and deactivation means may be arranged to inform the interception data collection means to collect data about active tunnels by an activation message and to stop collecting data by deactivation message. Moreover, the interception activation and deactivation means may be arranged to check a tunnel identification received from the interception activation monitoring means and to send a tunnel deactivation message to the interception data destination means, if the tunnel identification matches are criterium in the interception database.

The interception activation and deactivation means may be arranged in a lawful interception gateway, a gateway GPRS support node or serving GPRS support node.

The interception data collection means may be preferably arranged to inform the interception data destination means of an activated interception data collection by transmitting an interception activation message to the interception data destination means in response to which the interception data destination means starts storing received interception data for the new intercepted tunnel. In this case, the interception activation message may include a tunnel identification and a destination for the intercepted data.

The interception data collection means may be arranged in a lawful interception node, a GPRS support node or a border gateway.

Preferably, the interception data destination receives the collected intercepted data together with the intended destination thereof.

The interception data destination means may be arranged in a legal interception gateway, an interception browsing element, or a user equipment comprising a specific interception data destination processing capability.

Furthermore, the above object is achieved by a network element for a packet network, comprising:

setting means for setting an interception information in a PDP context thereof in response to a interception request received by the network element; and interception data collection means for collecting intercepted data in response to the interception information and for supplying the collected intercepted data to an interception destination.

Additionally, the above object is achieved by a method for performing a lawful interception in a packet network, comprising the steps of:

setting an interception information in a PDP context of a network element in response to an interception request;

collecting intercepted data in the network element in response to the interception information; and supplying the collected intercepted data to an interception destination.

Accordingly, due to the setting of an interception information in the PDP context of the network element, any network element of the packet network can be used for collecting intercepted data. Thus, the interception system is automatically scalable with every new network element and the bottleneck problem due to the known solutions can be prevented.

Furthermore, many legal interception gateways may coexist, since the collection of interception data is performed on the basis of the interception information included in the PDP context of the network elements.

Preferably, the interception information is a bit mask, or any equivalent fast data structure such as a linked list, wherein each bit refers to an entity that can request copies of data packets. In particular, each bit of said bit mask may refer to a listening context comprising an information about the interception destination. The information about the interception destination may comprise a destination address, authentication keys, a mastering interception gateway address, and a protocol information.

Preferably, the interception data collection means performs collection on the basis of an IMSI number or an IP address of a data packet.

The interception data collection means may be arranged to create a secure tunnel by a secure authentication, wherein the collected intercepted data is transferred via said tunnel using a secure data encryption. Thus, the secret information is situated only in the legal interception gateway which may be the destination of the collected intercepted data. The authentication and tunnelling may be performed by using VPN or SSH. Thus, a VPN tunneling is possible without a VPN device in every network segment.

The network element may be arranged to store entries for authenticated interception destinations which can set and reset the interception information.

In particular, the network element may be a gateway GPRS support node.

Furthermore, the above object is achieved by an interception browsing element for a packet network, comprising:

receiving means for receiving intercepted data from a network element having an interception data collection function;

storing means for storing interception data received from the network element; and browsing means for browsing the stored interception databased on an external command, and for supplying the result of the browsing to an interception authority.

Additionally, the above object is achieved by a method for performing a lawful interception in a packet network, comprising the steps of:

providing a first network element having an interception data collection function;

transmitting collected intercepted data from the first network element to an interception browsing element, browsing the transmitted intercepted data at the interception browsing element based on an external command from a second network element having an interception activation and deactivation function; and transmitting the result of the browsing step to an interception authority.

Accordingly, browsing and managing of the lawful interception can be performed separately in two different network elements. The interception browsing element does not have to be robust, because it doesn't affect the normal behaviour of the first network element having the interception data collection function.

Since many interception browsing elements can coexist, the browsing capacity may easily increased and redundancy implemented. Furthermore, no unnecessary secret information has to be processed in the interception browsing element.

Thus, a flexible interception system can be provided.

The external command can be supplied from a network element having an interception activation and deactivation function. Furthermore, the intercepted data may be received from the network element having the interception data collection function via a secure tunnel. In this case, the network element having the interception deactivation and deactivation function may have an authentication key different from that one of the interception browsing element. Thus, a secure control of the interception browsing elements and first network elements can be ensured.

The interception browsing element may be arranged at the network operator site, at the interception authority site, or at the public network site. Moreover, the interception browsing element may be a mobile terminal arranged in a mobile network connected to the packet network.

BRIEF DESCRIPTION OF THE DRAWINGS

In the following, the present invention will be described in greater detail on the basis of a preferred embodiment with reference to the accompanying drawings, in which.

DESCRIPTION OF THE PREFERRED EMBODIMENT

In the following, the preferred embodiment of the system and method according to the present invention will be described on the basis of a GPRS network.

Figure 1:
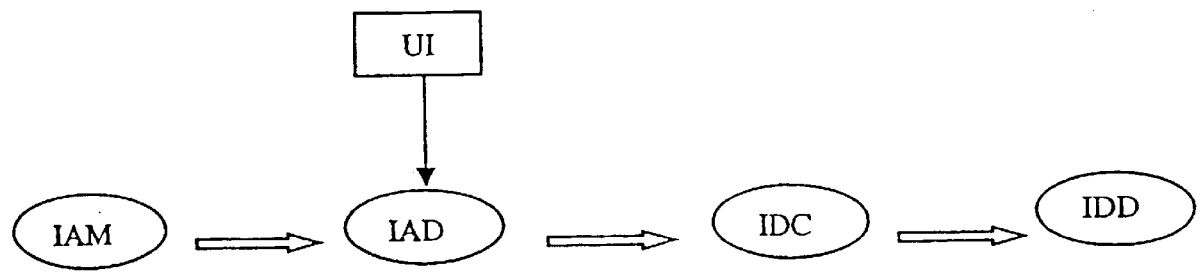
FIG. 1 shows a functional block diagram of a lawful interception system according to the present invention.

FIG. 1 shows a functional diagram of a lawful interception system for a packet network such as the GPRS network. According to FIG. 1 main functional units of the interception system are distinguished, such that an implementation in different real GPRS network elements is possible. According to the preferred embodiment, different implementation possibilities are available, and the most suitable implementation must be selected based on the overall GPRS implementation architecture.

In the following description, a path denotes a connection between a GGSN and an SGSN, and is used to multiplex GTP (GPRS Tunneling Protocol) tunnels. A tunnel designates a GTP tunnel between an SGSN and a GGSN, which carries a data packet belonging to one user connection. User data packets are called T-PDUs and are carried in G-PDU packets. A tunnel identifier TID is included in each GTP packet and contains an IMSI (International Mobile Subscriber Identity) number.

A tunnel activation refers to an activation of a tunnel by creating a PDP (Packet Data Protocol) context for a user connection. The SGSN initiates the PDP context creation by sending a Create_PDP_Context_Request message to the GGSN. The GGSN replies by sending a Create_PDP_Context_Response message to the SGSN. After a tunnel is activated, user data is transferred via the tunnel within G-PDU packets, wherein a GPDU packet contains a GTP header and user data T-PDU.

The tunnel is deactivated by deleting a PDP context earlier created for a user connection. The SGSN initiates the PDP context deletion by sending a Delete_PDP_Context_Request message to the GGSN. The GGSN replies by sending a Delete_PDP_Context_Response message to the SGSN.

The functional datagram shown in FIG. 1 consists of four functional units. An interception activation monitoring function IAM which monitors the created and deleted tunnels, in order to gather information about the requirement of activation of any interception in any other units. Furthermore an interception activation and deactivation function IAD activates and deactivates the current interception targets, i.e. tunnels, according to an information supplied from the IAM and commands supplied from a user interface UI in order to change interception criteria. Additionally, an interception data collection function IDC is provided, which actually collects the intercepted data transferred in tunnels and forwards it to an interception data destination function IDD which receives the intercepted data, probably postprocesses it and forwards it to the final destination which may be a representative of some legal authority or a network operator.

Figure 2:
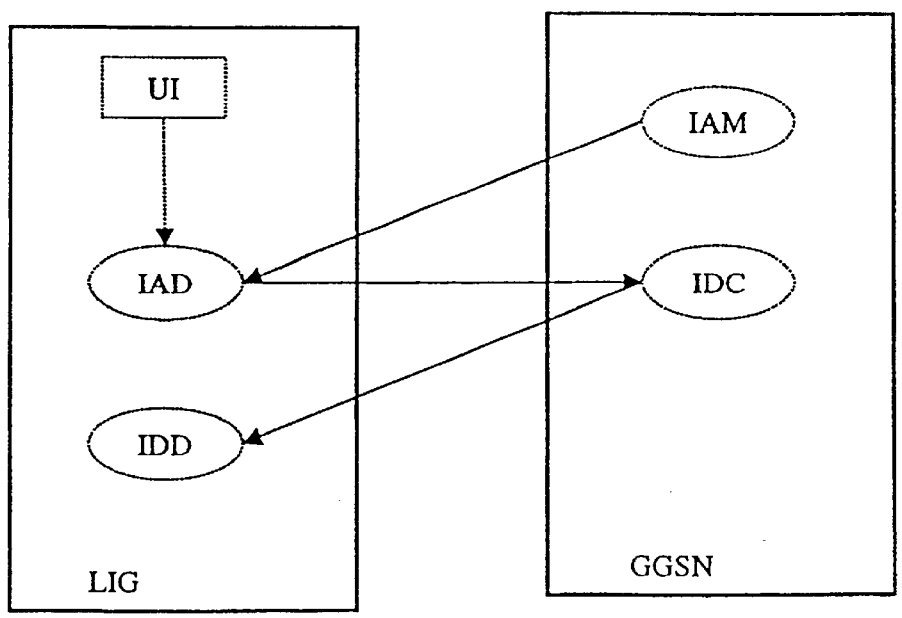
FIG. 2 shows a general block diagram of an implementation of a lawful interception system according to the preferred embodiment of the present invention.

A possible implementation alternative according to the preferred embodiment of the present invention is shown in FIG. 2. This implementation alternative is suitable in case the GGSN is implemented as a separate network element.

According to FIG. 2, a network element LIG implements the functional units IAD and IDD. In addition thereto, the LIG also contains the user interface UI for lawful interception. The functional units IAM and IDC are added to an already existing GGSN. The GGSN is a suitable place for these functional units, since it anyway has to inspect every GTP packet it receives, and little extra load is therefore required to check Create_PDP_Context_Request and Delete_PDP_Context_Request messages and update internal data structures accordingly. For the same reason, the GGSN is able to duplicate the G-PDU packets of intercepted targets with a minor effort.

The GGSN does not need to store any interception criteria, because it only checks the active tunnels, i.e. the created PDP contexts. Moreover, if it is sufficient to intercept only tunnels to be created after interception criteria are changed, then the GGSN does not need to know the interception criteria, at all. This is because the LIG would inform the GGSN to intercept specific tunnels, and would not supply any interception criteria to be applied.

However, in case tunnels, which are open at the time of an interception request, need to be intercepted, the LIG has to inform the GGSN of the interception criteria. In this case, the GGSN will then apply the criteria to all active tunnels, and the GGSN does not need to store the criteria.

In the following, the operation of the above functional units of the interception system according to the preferred embodiment will be described.

The IAM monitors whether an interception of tunnels needs to be activated. The check is based on monitoring tunnel activations and deactivations, preferably by monitoring the corresponding GTP messages. The IAM function informs the IAD function about new possible interception targets and possible currently intercepted and now finished tunnels. If the IAM function detects an activation of a tunnel, it transmits a Tunnel_Activated(TID) message to the IAD function. The beginning of a tunnel can be detected in many ways. For instance, if the implementation alternative according to FIG. 2 is used, the GGSN receives a Create_PDP_Context_Request(TID) message, when a tunnel is activated. If the IAM function and the IAD function are implemented in the same network element, the detection of a tunnel activation can be notified e.g. by updating a database instead of sending a data message.

If the IAM function detects the deactivation of a GPRS tunnel, it transmits a Tunnel_Deactivated(TID) message to the IAD functions. The deactivation of a tunnel may be detected on the basis of a Delete_PDP_Context_Request (TID) message. As in the previous case, the tunnel deactivation does not have to be notified by transmitting a data message.

The IAM function can be located in the following network elements:

LIN (Lawful Interception Node) which is able to recognize tunnel activation and deactivation requests on the basis of intercepted GTP protocol messages in the corresponding network segment;

GGSN which receives PDP context create and delete requests;

SGSN which sends PDP context create and delete requests; and

Boarder Gateway (BG) which detects tunnel activations and deactivations having their other end at another GPRS network.

The IAD activates and deactivates the current interception targets based on the information it obtains about interception criteria and created or deleted tunnels. The IAD receives interception criteria via its user interface UI, and an information about new and finished tunnels from the IAM function. The interception criteria comprise an information about the destination of the intercepted data, e.g. user and destination address. Based on the interception criteria and the tunnel changes, the IAD function informs the IDC function to collect the correct interception data.

The IAD function comprises an interception database which is modified in line with any changes of the interception criteria obtained via the user interface UI. Moreover, the IAD function informs the IDC function to collect data about new active tunnels by an Activate(criterion) message, and to stop collecting data by an Deactivate(criterion) message. It is to be noted, that this is the only case where an interception criterion needs to be transmitted elsewhere from the IAD function.

If only entire tunnels need to be intercepted, the Activate (criterion) and Deactivate(criterion) messages would not be required. This is because the IAM function informs the IAD function about each new tunnel by the Tunnel_Activated (TID) message. The IAD function then checks if some interception criteria in its interception database matches the tunnel identification TID. If so, the IAD function transmits an Activate_Inter(TID, D) message to the IDC function in order to activate the interception of the tunnel TID for the destination D.

If the IAD function receives Tunnel_Deactivate(TID) message from the IAM function a, it first checks whether the tunnel identification TID matches any criterion in the interception database. If so, it transmits a Tunnel_Deactivated (TID, D) message to the IDD function. Thereby, the IDD function is informed of the deactivation of a currently intercepted tunnel, wherein D denotes the destination of the intercepted data.

The IAD function can be located in the following network elements:

LIG (Lawful Interception Gateway) implemented as a separate network element;

SGSN;

GGSN.

It is to be noted that the IAD function is the only functional unit that needs to store the interception criteria for future use. In this way, a lawful interception can be implemented in GPRS without requiring a distribution of an interception criteria, and the configuration management can be centralized to the IAD function.

The IDC function actually collects the intercepted data and forwards it to the IDD function as the destination. The IDC function receives information about intercepted targets from the IAD function. It is to be noted that the IDC function does not need to store any interception criteria. Moreover, in case only tunnels activated after the criteria has been set are intercepted, the IDC function does not need to know any interception criteria, but is informed to collect data about a specific tunnel distinguished by the tunnel identification TID.

If the IDC function receives an Activate_Inter(TID, D) message from the IAD function, it activates a data collection for the tunnel with the corresponding tunnel identifier TID, so that the intercepted data will be transmitted to the destination D. Moreover, the IDC function informs the IDD function by transmitting an Activated_Inter (TID, D) message. Based on this message, the IDD function starts storing data for the new intercepted tunnel.

If the IDC function receives from the IAD function an Activate(criterion) or Deactivate(criterion) message, it activates or deactivates the interception data collection among its currently active tunnels. The criterion contains information about the intercepted data destination. The IDC function does not need to store any criterion for further use. The IDC function transmits to the IDD function a message Activated (TID, D) or Deactivated(TID, D) for each activated or deactivated tunnel. The IDD function requires these messages to start or stop data storing for a specific tunnel. It is to be noted that, in this case, no Activate_Inter(TID, D) or Tunnel_Deactivated(TID, D) messages are transmitted to the IDD function.

If the IDC function recognizes data in a G-PDU(TID) for an intercepted tunnel, it forwards the data to the IDD function using a GTP_DATA(TID, D) message. Therein, D denotes the data destination of the intercepted data, which is known by the IDC function. Since the IDC function (and the IAD function) inform the IDD function about any tunnel or interception start and stop, the IDD function has initialized data receiving for the corresponding tunnel TID and destination D before it receives any data packets.

The IDC function can be located in the following network elements:
  LIN which intercepts its network segment and transmits intercepted data to the IDD function
  GGSN which duplicates all user data to be intercepted and forwards the duplicate data flow to the IDD function;
  SGSN which duplicates all user data to be intercepted and forwards the duplicate data flow to the IDD function; and
  BG (Boarder Gateway) which detects all data traffic to foreign GPRS networks.

The IDD function receives the intercepted data and knows information about the tunnel or interception activation and deactivation. The IDD function may postprocess the data, e.g. decrypt, format or translate, and forward it to the final destination. The final destination may be a representative of a legal authority or a network operator.

If the IDD function receives an Activated_Inter(TID, D) or Tunnel_Deactivated(TID, D) message it knows that the intercepted tunnel is either activated or deactivated. Based on this information, it can initialize or release internal data structures needed for storing the intercepted data for the corresponding tunnel TID and destination D. Similarly, the IDD function is informed by the messages Activated(TID, D) or Deactivated(TID, D) that interception has either been initialized or finished for an active tunnel. Among this control messages, the IDD function receives the intercepted data for a tunnel together with its intended destination. The IDD function postprocesses the intercepted data and forwards it to its final destination. The kind of postprocessing depends on the specific application. Therefore, the implementation of the IDD function should be flexible enough to accept new postprocessing functions which might be determined by a user.

The IDD function can be located in the following network elements:
  LIG which then contains the interception activation, postprocessing and delivery of intercepted data;
  a separate network element such as an interception browsing element (LIB); and
  a user's equipment which contains a specific IDD function.

The above described functional units communicate with each other in order to implement the lawful interception in GPRS.

In the following, some specific cases are described on the basis of FIGS. 3 to 5.

Figure 3:
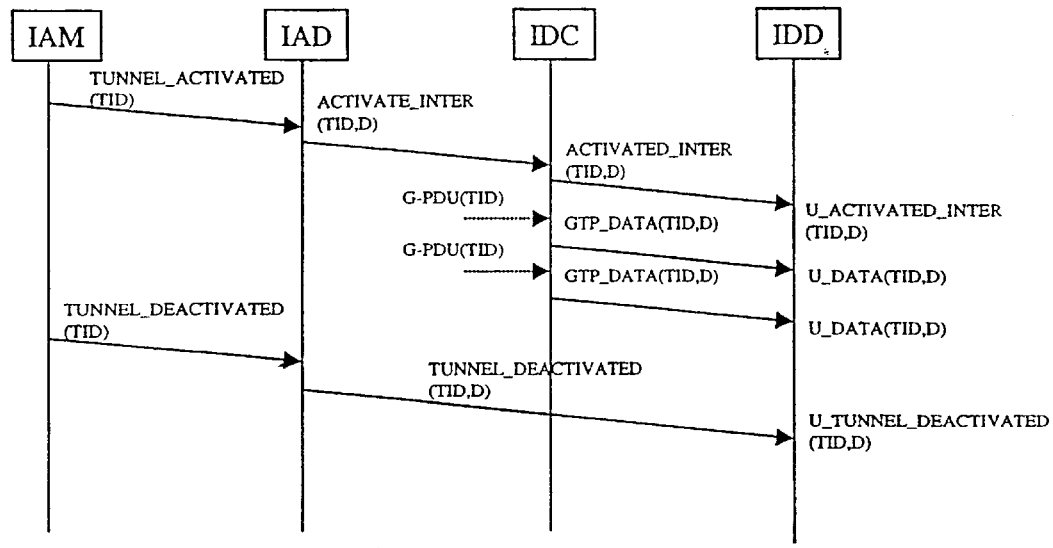
FIG. 3 shows a transmission diagram relating to an interception of a tunnel according to the preferred embodiment of the present invention.

FIG. 3 illustrates a case where a tunnel should be intercepted and the interception criteria remain the same during the activity of the tunnel. According to FIG. 3, the IDD receives the tunnel activation message, tunnel deactivation message and all transferred user data. Moreover, the IDD function is able to collect all date of one tunnel together using the corresponding tunnel identifier TID. The IDD function delivers the intercepted data to the corresponding destination D.

Figure 4:
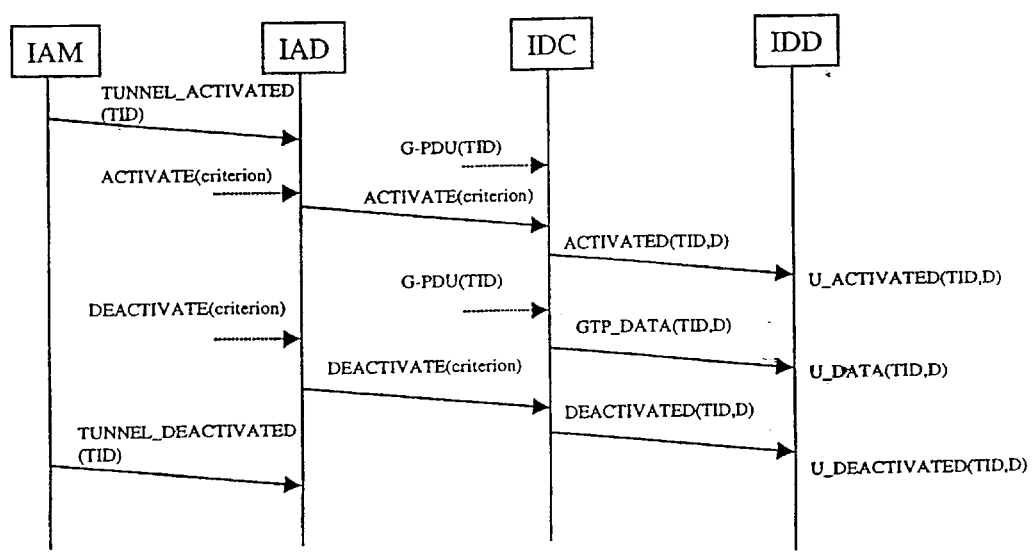
FIG. 4 shows a transmission diagram of an updating of interception parameters according to the preferred embodiment of the present invention.
Figure 5:
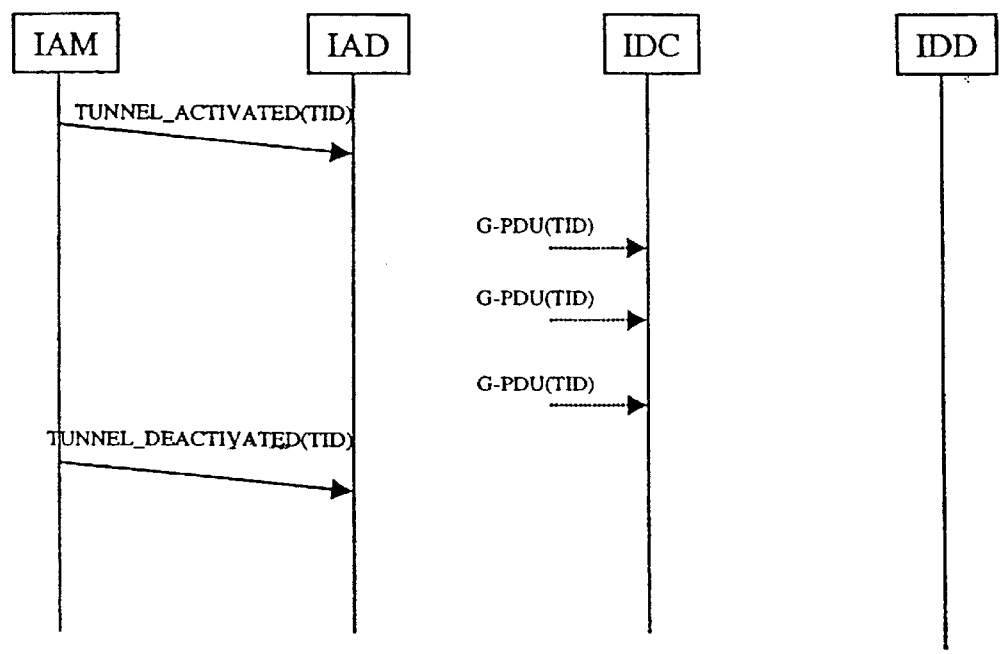
FIG. 5 shows a transmission diagram relating to a case where no tunnel is intercepted.

It is to be noted, that a solid arrow in the transmission diagrams according to FIGS. 3 to 5 indicates the transmission of a message or a data packet between the functional units IAM, IAD, IDC and IDD, respectively, and a doted arrow denotes a message or a data packet externally received by the corresponding functional unit.

According to FIG. 4, a case is shown where a tunnel is initially not intercepted, but will be intercepted after the interception criteria have been changed. Before the end of the tunnel is notified by the IAM function, the interception criteria again have been changed by an external user via the user interface UI, so that the tunnel is not intercepted anymore. As can be seen, the IDD function is informed about the start of interception and the end of interception of this tunnel. Moreover, the IDD function receives all GTP data packets which are transferred between the activation and deactivation of the interception.

FIG. 5 shows a case in which a tunnel should not be intercepted at all. According to FIG. 5, the IDD function does not receive any information about the corresponding tunnel TID. In effect, only two protocol messages are exchanged between the IAM function and the IAD function for a tunnel which is not intercepted. The G-PDU data packets relating to the corresponding tunnel and received by the IDC function are not transmitted to the IDD function.

It is to be noted that the above described functional units can be implemented in a single network element, or can be distributed among several network elements, as described above.

Figure 6:
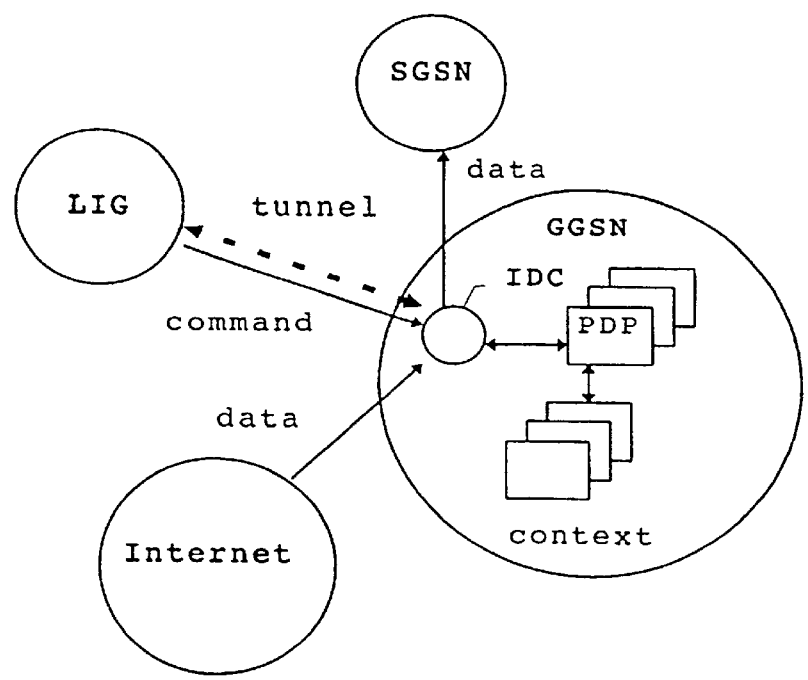
FIG. 6 shows a diagram of an implementation of an interception data collection function in a GGSN.

FIG. 6 shows another implementation alternative according to the preferred embodiment of the present invention, wherein the IDC function is arranged in a GGSN of the GPRS network. The data packets to be intercepted are transmitted from the Internet via the GGSN to an SGSN. In the present case, the IAD function and the IDD function are located in a LIG. The IAM function may be located in the GGSN or the SGSN.

Since the GGSN includes the IDC function, it is capable of collecting interception data in response to an activation or deactivation, received from the LIG. The activation can be based on an IMSI number or an IP address. The GGSN transfers the collected intercepted data via a secure tunnel, indicated by a doted arrow in FIG. 6, to the IDD function provided in the LIG. The tunnel creation is based on a secure authentication, and the following data transfer is performed by using a secure data encryption.

In the GGSN, a PDP context is stored, into which an interception information such as a spy-bit is set on or off by the IDC function in response to a command issued by the LIG. The spy-bit may be a linked list or a bit mask such as a 32-bit word, wherein each bit refers to an entity that can request copies of the data packets. Furthermore, entries for the authenticated LIGs which can set and reset the interception information are also stored in the GGSN. The protocol between the LIG and the GGSN is authenticated and tunneled in a secure way, i.e. using VPN (Virtual Private Network) or SSH.

It is to be noted, that the IDC function may as well be comprised in the SGSN, since the GGSN may be at another operator's site in case an inter-GPRS traffic is performed.

Each packet received or transmitted by the GGSN is linked to the PDP context, such that it is easy and efficient to check the spy-bit mask as an additional issue for all possible destinations which are interested in the data. After the checking has been performed, only a few additional instructions are required to check each message such that the GGSN does not constitute a bottleneck. The copying or duplication of the intercepted data to one or several location requires only a few messages. The separate transmission to the secure tunnel and other additional operations only have to be performed for intercepted messages.

If the PDP context includes activated bits (on-bits) in its spy-bit mask, each bit refers to a listening context in which an information about the respective destination is stored. This information contains at least the destination address to which the intercepted data are to be sent, authentication keys (own keys and public keys), mastering LIG's address and authentication keys, as well as other related information required to establish the protocol between the GGSN and the LIG.

Accordingly, the interception data can be gathered by the existing network elements. The interception load is automatically balanced in line with a normal data transfer load. Each network element may intercept the data packets flowing through it. The secure tunneling may also be used for controlling the spy-bit setting.

In the following, a further implementation alternative of the preferred embodiment of the present invention is described with reference to FIGS. 7 to 10.

According to this implementation alternative, the IDD function is provided in a new network element used to collect and browse intercepted data. The new element is called a Lawful Interception Browser (LIB). It is to be noted that the LIB may be arranged together with the LIG in the same network element.

As the LIB includes the IDD function, it is the termination of the secure tunnel from the IDC function. The connection between the LIB and the IDC function is authenticated using keypairs. The management of keys is done by the IAD function which may be provided in the LIG.

The LIB receives, stores, browses and analyses the intercepted data packets. In case an encryption is used, the LIB can be located at the network operator site, at the interception authority site, or anywhere in the network, as described later.

In the present case, browsing and managing the lawful interception is separated into different network elements. The LIG is arranged to introduce those intercepting network elements and LIBs, which it can control. After this, the LIG can securely control LIBs and intercepting elements and further exchange their keys. The interception network will have separate authentication keys for the LIG and the LIB.

When the interception is activated by the LIG, the intercepting elements are activated as well as the listening LIBs. This activation includes public key exchanges between the LIB and the corresponding data intercepting element. These intercepting session keys can even be generated separately for each session. The secure tunnel is then established between the LIB and the IDC function. The LIG can activate any number of network elements in order to intercept the same connection.

The intercepting network element(s) will feed the intercepted data to the secure tunnel. In this phase, the IAD function included in the LIG does not participate. The IAD function included in the LIG starts the deactivation of the interception session. This task includes the deactivation of the tunnel between the LIB and the intercepting network element.

Figure 7:
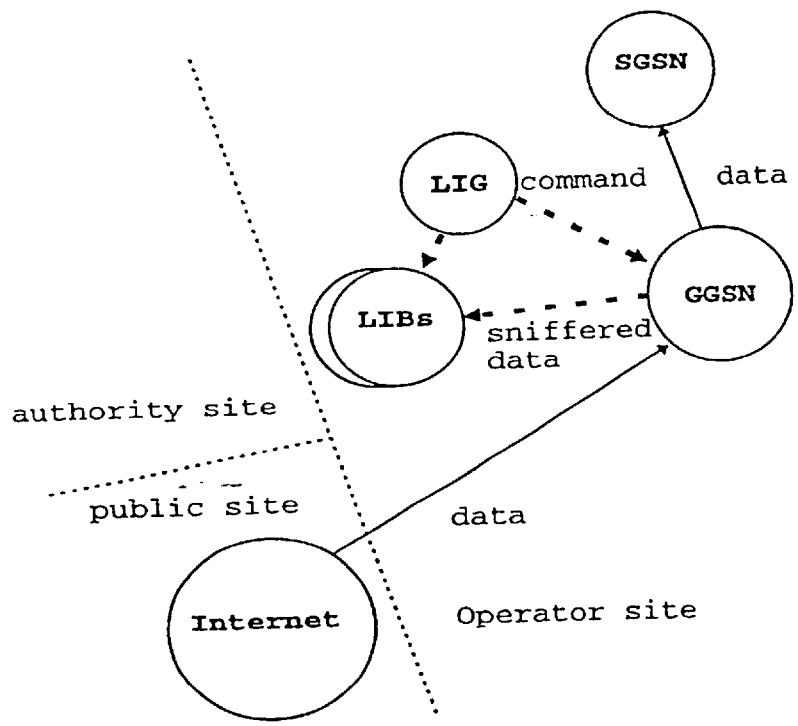
FIG. 7 shows a diagram of a lawful interception system according to the preferred embodiment of the present invention, wherein the network operator manages the whole lawful interception.

FIG. 7 shows a lawful interception system according to the preferred embodiment of the present invention, wherein the network operator manages the lawful interception. In the present case the intercepting network element is a GGSN and is controlled by the LIG so as to transmit the intercepted data (sniffered data) to one or a plurality of LIBs.

Since the network operator manages the lawful interception, both the LIG and the LIBs are located at the operator's site. As indicated by the doted arrows, the communication between the LIG, the GGSN and the LIBs is performed by using encrypted tunnels.

Figure 8:
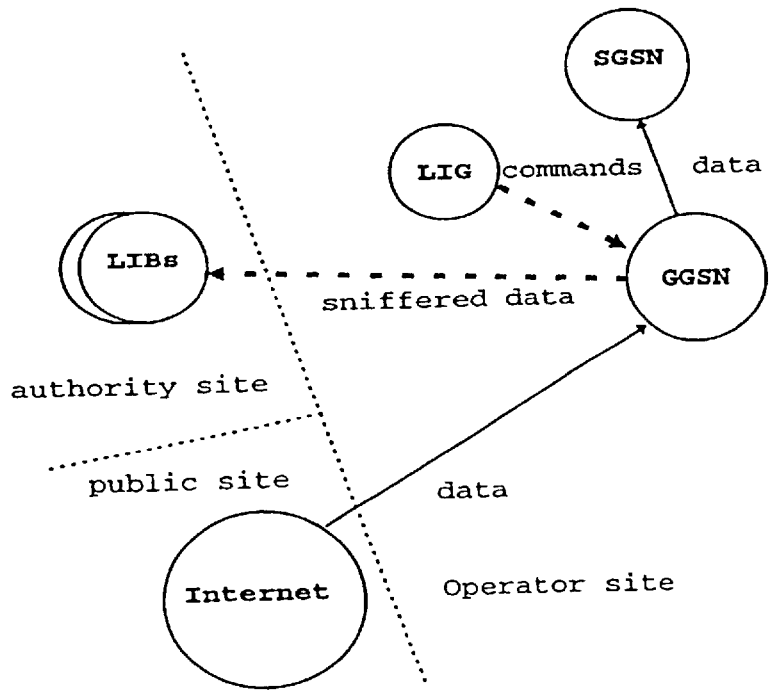
FIG. 8 shows a diagram of the lawful interception system according to the preferred embodiment of the present invention, wherein the network operator manages the activation and deactivation of interception and the interception authority owns the network element where the data is gathered.

FIG. 8 shows a case where the network operator manages the activation and deactivation of interception and the interception authority owns the network element (LIBs) where the data is gathered. This could be the case in countries where a police authority brings a court order to the network operator. The network operator then activates data collection and transfers it to the interception authority's site.

Figure 9:
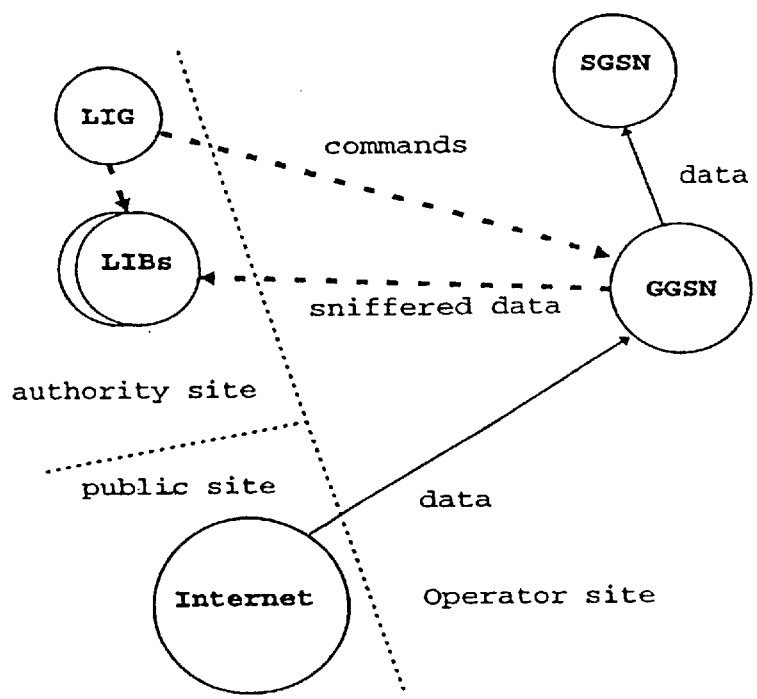
FIG. 9 shows a diagram of a lawful interception system according to the preferred embodiment of the present invention, wherein the interception authority controls the interception.

Furthermore, FIG. 9 shows a case where the interception authority has a full control over the interception of all traffic, since the LIG and the LIBs are both located at the interception authority's site. This is the case for most national investigation agencies.

Figure 10:
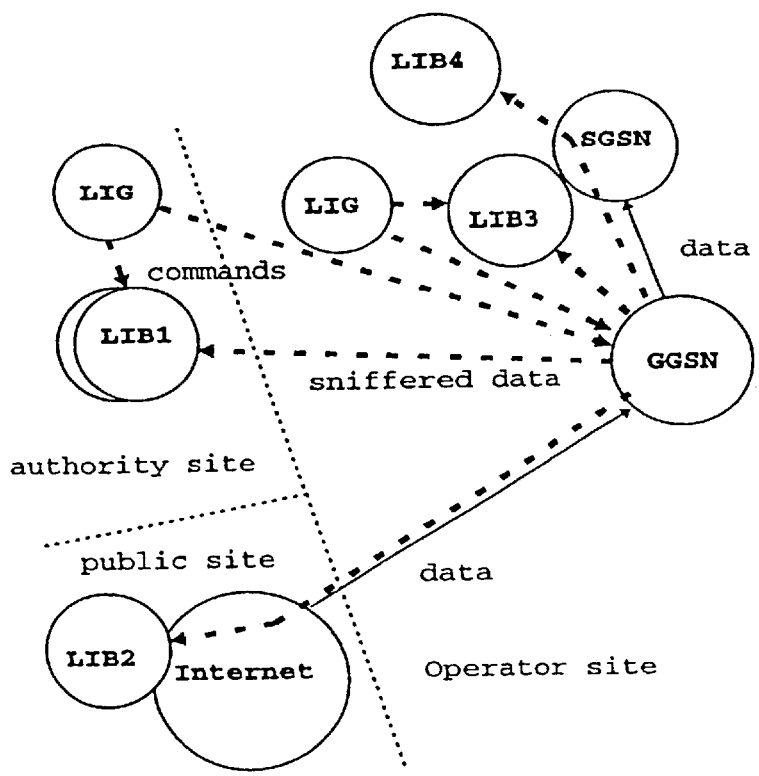
FIG. 10 shows a diagram of a lawful interception system according to the preferred embodiment of the present invention, wherein the network operator and the interception authority both control the interception.

Finally, FIG. 10 shows a complex case, where the network operator and the interception authority have their own LIGs and LIBs. In the present case, only one interception authority is shown. However, the number of authorities or LIGs is not limited. The LIBs can be managed and owned by the network operator, the interception authority, or by both.

According to FIG. 10, the LIGs and command interfaces for the LIB2 and LIB4 are not shown for clarity reasons. The LIB2 relates to a case where the interception browsing happens at any site of the Internet. The lawful interception browsing authority just needs to own the LIB, which can as well be sold as a unique or windows software.

The LIB4 shows the possibility of a mobile interception browsing by means of a mobile terminal connected via the mobile network to the SGSN. The cases of the LIB1 and LIB3 correspond to the above cases already described in connection with FIGS. 7 and 9.

Thus, the browsing and activation of interception can be arranged at different authorities or sites. When the interception authority is outside the operator's premises, the operator does not know who is being intercepted and has no access to the intercepted data. The operator may only determine the volume of the total traffic.

The IDC network elements are always arranged at the operator sites and are introduced to the LIG owning authorities by key exchanges. In the case of a court order, the court authority may own the LIG that enables the interception of the "police" LIB. A licensed usage may act in the same way, i.e. a super authority owns a LIG that can command all LIBs in the networks or at the operator's site. Real-time and place-independent browsing is possible, because the browsing function is separated and connected with a secure tunneling. The other alternative is that the intercepted data is collected and securely manually transported to the browsing authority. When browsing is done in real-time, immediate authority actions are possible. Moreover, place-independence of browsing is possible at the wireless site of the network.

Many LIBs can coexist, such that the encryption breaking can be distributed. Many LIBs can receive the same data and use different approaches to brake the encryption.

The LIBs may have customer-tailed features such as seeking for words like "drugs" and all its synonyms for customs, or seeking for the word "erotic" for sex-authorities in Far East countries etc.

The LIB only knows the connection that is ordered to browse, wherein every other connection is invisible to the LIB. The LIG keeps track of the intercepted sites and their names. The amount of interception traffic can be blurred by performing fake interceptions and keeping the interception traffic at a certain volume.

It is to be noted that the interception system and method described in the preferred embodiment can be applied to any packet network. The above description of the preferred embodiment and the accompanying drawings are only intended to illustrate the present invention. The preferred embodiment of the invention may thus vary within the scope of the attached claims.

In summary, an interception system and method for performing a lawful interception in a packet network such as the GPRS or UMTS network is described. The interception system comprises an interception activation monitoring function, an interception activation and deactivation function, an interception data collection function and an interception data destination function. The interception data collection function can be implemented in an existing network node such as a GPRS node, wherein an interception information is set in the corresponding PDP context, and the collection of the intercepted data is performed in response to the set interception information. Furthermore, the interception data destination function may be arranged in an interception browsing element arranged for browsing the intercepted databased on an external command received from another network element comprising the interception activation and deactivation function. Thereby, browsing and managing of the lawful interception can be separated into different network elements. In summary, a flexible interception system can be provided, which can be easily adapted to individual architectures of packet networks.

What is claimed is:

1. An interception system for performing a lawful interception in a packet network, comprising:
   a) interception activation and deactivation means (IAD) for activating and deactivation current interception targets based on a received interception-related command;
   b) interception activation monitoring means (IAM) for monitoring an activation of PDP contexts and for informing said interception activation and deactivation means (IAD) of changes in said PDP contexts;
   c) interception data collection means (IDC) for collecting intercepted data in response to an interception target activation by said interception activation and deactivation means (IAD); and
   d) interception data destination means (IDD) for receiving said collected intercepted data and forwarding it to a final interception destination.

2. A system according to claim 1, wherein said final destination is a representative of a legal authority or a network operator.

3. A system according to claim 1, wherein said interception data destination means (IDD) is arranged to postprocess said intercepted data.

4. A system according to claim 3, wherein said postprocessing comprises decryption, formating and/or translation of said intercepted data.

5. A system according to claim 1, wherein said interception activation and deactivation means (IAD) receives said interception-related command from a user interface (UI) for lawful interception, wherein said interception-related command is a command for changing current interception criteria.

6. A system according to claim 5, wherein said interception activation and deactivation means (IAD) and said interception data destination means (IDD) are arranged in a network element comprising said user interface (UI) for lawful interception.

7. A system according to claim 1, wherein said interception activation monitoring means (IAM) and said interception data collection means (IDC) are arranged in a gateway GPRS support node (GGSN).

8. A system according to claim 1, wherein said interception activation monitoring means (IAM) is arranged to monitor tunnel activations and deactivations by monitoring corresponding GTP protocol messages, and to inform the interception activation and deactivation means (IAD) about new possible interception targets and/or currently intercepted and now finished tunnels.

9. A system according to claim 1, wherein said interception activation monitoring means (IAM) is arranged in a lawful interception node and adapted to recognize tunnel activation and deactivation requests on the basis of GTP protocol messages.

10. A system according to claim 1, wherein said interception activation monitoring means (IAM) is arranged in a serving GPRS support node (SGSN).

11. A system according to claim 1, wherein said interception activation monitoring means (IAM) is arranged in a boarder gateway (BG).

12. A system according to claim 1, wherein said interception activation and deactivation means (IAD) comprises an interception database and is arranged to modify said interception database in response to said interception related command.

13. A system according to claim 12, wherein said interception activation and deactivation means (IAD) is arranged to check a tunnel identification received from the interception activation monitoring means (IAM) and to transmit a tunnel deactivation message to the interception data destination means (IDD) if said tunnel identification matches a criterion in said interception database.

14. A system according to anyone of claims 1 to 13, wherein said interception activation and deactivation means (IAD) is arranged in a lawful interception gateway (LIG) or a GPRS serving node (SGSN, GGSN).

15. A system according to claim 1, wherein said interception activation and deactivation means (IAD) is arranged in a lawful interception gateway (LIG) or a GPRS serving node (SGSN, GGSN).

16. A system to claim 1, wherein said interception data collection means (IDC) is arranged to inform said interception data destination means (IDD) of an activated interception collection by transmitting an interception activation message to said interception data destination means (IDD), in response to which said interception data destination means (IDD) starts storing received interception data for the new intercepted tunnel.

17. A system according to claim 16, wherein said interception activation message includes a tunnel identification and a destination for the intercepted data.

18. A system according to claim 1, wherein said interception data collection means (IDC) is arranged in a legal interception node, a GPRS support node (GGSN, SGSN) or a boarder gateway.

19. A system according to claim 1, wherein said interception data destination means (IDD) receives said collected intercepted data together with the intended destination thereof.

20. A system according to claim 1, wherein said interception data destination (IDD) is arranged in a legal interception gateway (LIG), in an interception browsing element (LIB), or in a user equipment comprising a specific interception data destination processing capability.

21. A network element for a packet network, comprising:
setting means (IDC) for setting an interception information in a PDP context thereof in response to an interception request received by said network element; and
b) interception data collection means (IDC) for collecting intercepted data in response to said interception information and for supplying said collected intercepted data to an interception destination (LIG).

22. A network element to claim 21, wherein said interception information is a bit mask or a linked list, wherein each bit refers to an entity that can request copies of data packets.

23. A network element according to claim 22, wherein each bit of said bit mask or linked list refers to a listening context comprising an information about said interception destination (LIG).

24. A network element according to claim 23, wherein said information about interception destination (LIG) comprises a destination address, authentication keys, a mastering interception gateway address and a protocol information.

25. A network element according to claim 21, wherein said interception data collection means (IDC) performs collection on the basis of an IMSI number or an IP address of a data packet.

26. A network element according to claim 21, wherein said interception data collection means (IDC) is arranged to create a secure tunnel by a secure authentication, and wherein said collected intercepted data is transferred via said tunnel using a secure date encryption.

27. A network element according to claim 26, wherein said authentication and tunneling is performed by using VPN or SSH.

28. A network element according claim 21, wherein said network element is arranged to store entries for authenticated interception destinations (LIG) which can set and reset said interception information.

29. A network element according to claim 21, wherein said network element is a gateway GPRS support node (GGSN).

30. An interception browsing element for a packet network, comprising:

a) receiving means for receiving intercepted date from a network element (GGSN) having an interception data collection function;
b) storing means for storing interception data received from said network element (GGSN); and
c) browsing means for browsing said stored interception data based on an external command and for supplying the result of said browsing to an interception authority.

31. An interception browsing element according to claim 30, wherein said external command is supplied from a network element (LIG) having an interception activation and deactivation function.

32. An interception browsing element according to claim 31, wherein said network element (LIG) having an interception activation and deactivation function has another authentication key different from that one of said interception browsing element (LIB).

33. An interception browsing element according to claim 30, wherein said intercepted data is received from said network element (GGSN) having an interception data collection function via a secure tunnel.

34. An interception browsing element according to claim 30, wherein said interception browsing element (LIB) is a network element (LIB3) arranged at the network operator's site.

35. An interception browsing element according to claim 30, wherein said interception browsing element is a network element (LIB1) arranged at the interception authority's site.

36. An interception browsing element according to claim 30, wherein said interception browsing element is a network element (LIB2) arranged at the public network's site.

37. An interception browsing element according to claim 30, wherein said interception browsing element is a mobile terminal (LIB4) arranged in a mobile network connected to said packet network.

38. A method for performing a lawful interception in a packet network, comprising steps of:
a) monitoring an activation of PDP contexts in order to detect changes in said PDP contexts;
b) activating and deactivating current interception targets based on an interception-related command and said changes in said PDP contexts;
c) collection intercepted data in response to an interception target activation; and
d) supplying said collected intercepted data to an interception destination.

39. A method according to claim 38, wherein said monitoring an collection step is performed in a first network element (GGSN) and said activating and deactivating step in a second network element (LIG).

40. A method for performing a lawful interception in a packet network, comprising the steps of:
a) setting an interception information in a PDP context of a network element in response to an interception request;
b) collecting intercepted data in said network element in response to said interception information; and
c) supplying said collected intercepted data to an interception destination.

41. A method according to claim 40, wherein said interception information is a bit mask in which each bit refers to an entity that can request copies of data packets.

42. A method for performing a lawful interception in a packet network, comprising the steps of:

a) providing a first network element (GGSN) having an interception data collection function;

b) transmitting collected intercepted data from said first network element to an interception browsing element (LIB);

c) browsing said transmitted intercepted data at said interception browsing element based on an external command from a second network element (LIG) having an interception activation and deactivation function; and d) transmitting the result of said browsing step to an interception authority.

\* \* \* \* \*